United States Patent
Betz

(10) Patent No.: US 7,812,328 B2
(45) Date of Patent: Oct. 12, 2010

(54) RADIATION SOURCE FOR IRRADIATING THE INTERIOR WALLS OF ELONGATED CAVITIES

(75) Inventor: Wilhelm Leo Betz, Bad Bergzabern (DE)

(73) Assignee: Brandenburger Patentverwertung GDBR, Landau (DE)

( * ) Notice: Subject to any disclaimer, the term of this patent is extended or adjusted under 35 U.S.C. 154(b) by 122 days.

(21) Appl. No.: 12/115,569

(22) Filed: May 6, 2008

(65) Prior Publication Data
US 2008/0203321 A1 Aug. 28, 2008

Related U.S. Application Data

(63) Continuation of application No. PCT/EP2006/009994, filed on Oct. 17, 2006.

(30) Foreign Application Priority Data
Nov. 16, 2005 (DE) ........................ 10 2005 054 970

(51) Int. Cl.
*G21K 5/02* (2006.01)
*B01J 19/08* (2006.01)
*C08J 3/28* (2006.01)
(52) U.S. Cl. .............. 250/493.1; 250/494.1; 250/495.1; 250/504 R; 104/138.2; 138/97; 362/238; 362/249.09; 362/371; 362/385
(58) Field of Classification Search .............. 250/493.1, 250/494.1, 495.1, 504 R; 362/371, 385, 362/238, 249.09; 104/138.1, 138.2; 138/97
See application file for complete search history.

(56) References Cited

U.S. PATENT DOCUMENTS

| 3,642,032 A | * | 2/1972 | Cook et al. | ................... 138/97 |
| 6,371,631 B1 |   | 4/2002 | Reutemann |   |

FOREIGN PATENT DOCUMENTS

| DE | 195 27 316 A1 |   | 2/1997 |
| DE | 298 12 835 U1 |   | 9/1998 |
| DE | 200 12 893 U1 |   | 10/2000 |
| DE | 20012893 U1 | * | 10/2000 |
| WO | 98/17939 A1 |   | 4/1998 |

OTHER PUBLICATIONS

International Search Report, dated Feb. 12, 2007.

* cited by examiner

*Primary Examiner*—Jack I Berman
(74) *Attorney, Agent, or Firm*—Laurence A. Greenburg; Werner H. Stemer; Ralph E. Locher

(57) ABSTRACT

A radiation source apparatus for irradiating the inner walls of elongated cavities, especially for hardening of artificial resin laminates that can be radiation hardened by ultraviolet or infrared radiation, has a base body with at least one light source and multiple wheels by which the apparatus is guided inside the cavities. The multiple wheels are movably mounted on arms in a direction radial to the base body. At least one gas pressure spring is assigned to each arm, which pushes the arm from a radially proximal first position into a radially distal second position.

7 Claims, 3 Drawing Sheets

US 7,812,328 B2

RADIATION SOURCE FOR IRRADIATING THE INTERIOR WALLS OF ELONGATED CAVITIES

CROSS-REFERENCE TO RELATED APPLICATION

This is a continuation, under 35 U.S.C. §120, of copending international application PCT/EP2006/009994, filed Oct. 17, 2006, which designated the United States; this application also claims the priority, under 35 U.S.C. §119, of German patent application DE 10 2005 054 970.5, filed Nov. 16, 2005; the prior applications are herewith incorporated by reference in their entirety.

BACKGROUND OF THE INVENTION

Field of the Invention

The invention relates to a radiation source apparatus for irradiating the interior walls of elongated cavities, especially for hardening artificial resin laminates that can be radiation hardened using ultraviolet or infrared radiation. The apparatus has a base body with at least one light source and multiple wheels for guiding the base body within the cavity placed on arms for moving in a radial direction relative to the base body.

Radiation sources for irradiating the interior walls of elongated cavities are used to do ultraviolet hardening of a coating hose (liner) for rehabilitating pipelines and channel systems made of an artificial resin laminate, after which the liner is inserted into the interior spaces of the pipeline to be rehabilitated, and expanded by means such as compressed air.

A generic radiation source is described in German utility model DE 200 12 893 U1. There, the radiation source has a base body that has multiple modules connected to each other via rods and ball joints, on each of which wheels and ultraviolet light sources are placed. The wheels are movably admitted onto corresponding telescope arms and after the radiation source is inserted into the liner by removal of a locking bolt, are deployed outward with the aid of a control cable via assigned pressure springs in a radial direction toward the interior wall, before the radiation source for hardening the artificial resin laminate using ultraviolet light is drawn through the interior space of the liner. With the described radiation source, the wheels are loaded by a severe force resulting from the heavily increasing spring force when they converge, when small-diameter cavities are irradiated, while in contrast, the force acting on the wheels when the cavity diameters are great and the arms are deployed far out, is relatively small.

A further problem exists with radiation sources of the type described previously, with arms braced merely by springs, in that the arms deploy abruptly with no damping, and impact with great weight on the inner wall of the liner to be irradiated, when the locking bolts are removed for deploying the radiation source which is inserted in the liner in a retracted state.

Further, when a radiation source of the type described before, with swiveling arms that were braced only via spiral compression springs, was pulled through, the applicant observed that the lower arms tend to buckle under high tensile stress, especially when the arms with wheels admitted onto them are deployed far out, and the cavity or channel has step structures in the bottom area which develop for example by warping. Through this a danger exists that the especially sensitive interior foil hose of the liner gets damaged when the radiation source is drawn in, if pieces of the base body of the radiation source, after the arms buckle, contact the bottom area of the liner.

SUMMARY OF THE INVENTION

It is accordingly an object of the invention to provide a radiation source for irradiating inner walls of elongated cavities which overcomes the above-mentioned disadvantages of the heretofore-known devices and methods of this general type and which provides for a radiation source of simple design, and in which the wheels, even if they have differing diameters, fit against the cavities to be irradiated with a relatively constant force on the interior wall of the particular cavity.

With the foregoing and other objects in view there is provided, in accordance with the invention, a radiation source apparatus for irradiating an inner wall of an elongated cavity, comprising:

a base body having at least one light source;

a plurality of wheels for guiding the base body in the elongated cavity;

a plurality of arms each carrying a respective one of the wheels for guiding the base body within the cavity movably in a radial direction relative to the base body between a radially proximal first position and radially distal second positions;

each the arm having a first section rigidly mounted to the base body and extending outwardly from the base body, and a second section articulated to the first section;

at least one gas pressure spring assigned to each the arm for pushing the respective the arm from the radially proximal first position to a radially distal second position, the at least one gas pressure spring having a first end connected to the first section and a second end connected to the second section of the respectively associated the arm.

In a preferred implementation of the invention, the light source is a UV or IR radiation source and the apparatus is configured for hardening artificial resin laminates that can be radiation-hardened using ultraviolet or infrared radiation.

In other words, the objects of the invention are achieved with a novel radiation source apparatus for using ultraviolet or infrared radiation to irradiate the inner walls of elongated cavities, as are used for hardening of linings drawn into channels, comprises a base body, on which a light source in the form of one or more ultraviolet or infrared lamps is placed. The base body itself, which can for example be an elongated tube, in whose interior space electric wires are run to supply the lamps, is provided with multiple wheels situated at various circumferential positions, which serve to guide the radiation source or the base body within the cavity, and which are placed on arms that can be deployed relative to the base body, which latter are able to be moved from an initial radially proximal position into a second radially distal position.

The radiation source is distinguished in that at least one gas pressure spring is assigned to each arm, which pushes the arm from the initial radially proximal position into the second radially distal position.

By use of a gas pressure spring instead of the spiral pressure springs customarily employed in the state of the art, an advantage is obtained in that due to the relatively flat spring-action characteristic curve of gas pressure springs, the pressure by which the wheels are applied to the inner wall of the liner is essentially constant when there are small changes in the diameter of the cavity to be irradiated or when there is unevenness in the interior space of a channel also. By this it is ensured that each of the wheels is applied to the inner wall with essentially the same pressure, resulting in an optimal centering of the base body within the cavity during the irradiation process.

In the preferred embodiment form of the invention, the arms are embodied in two parts, for which each arm comprises a first section that is mounted securely onto the base body, and extends out from it, and a second section that connects with it by means of a joint. The first end of the gas pressure spring is connected with the first section, and with its second, preferably piston-rod end, it is connected with the second section, whereby preferably the turning axis of the jointed connection of the first and second section runs parallel to the turning axis of the assigned wheel.

According to another advantageous embodiment of the invention-specific radiation source, the gas pressure spring is of such a length, and is attached with its first and its second end at such an interval removed from the pivot point of the joint, that in its fully retracted setting, i.e., in the initial radially proximal position, the gas pressure spring acts as a stop that effectively prevents further swiveling of the second section relative to the first section. From this there arises an advantage in that the base body or the light source itself, even in the event that an arm buckles in, cannot come into contact with the liner, so that the danger of damage to the interior foil hoses that usually are inserted into liners is reliably avoided with no additional hardware expense.

According to a further concept that is the basis for the invention, an arresting device is assigned to each arm of the radiation source, which locks the arm in the initial radially proximal position against pivoting into the second radially distal position.

In doing so, in the case of the embodiment form that is preferably used, with an arm having a first and a second section, the arresting device is placed in advantageous fashion on the first section of the arm that is mounted securely onto the base body, and has a pivoting lever on whose tip for example a projection is formed, which acts together with a stop provided on the second section of the arm, so that due to the elastic spring force of the gas pressure spring, the end of the pivoting lever that faces the stop is pushed in the direction of the first section or to the joint, so that the pivoting lever is independently arrested by the force of the gas pressure spring, and the arresting action is only canceled by pressing on the opposite end of same.

This embodiment form of the invention offers an advantage in that, before the radiation source is pulled in, outside the channel, preferably all arms of the radiation source can be manually pivoted by swiveling the second section against the forces of the gas pressure springs into the initial position, and the radiation source then can be easily inserted in its retracted state into the cavity to be irradiated. Preferably after the entire radiation source is fully inserted into the cavity, the arms can be successively deployed by pressing on each second end of the pivoting levers.

When the radiation source is deployed, the use of the invention-specific gas pressure springs has an additional advantage in that the arms, or the second sections, are likewise moved in damped fashion due to the damping action of the gas pressure springs into the second radially distal setting, and are brought into contact with the inner wall of the cavity to be irradiated, by which the danger is effectively reduced that the liner or the sensitive inner foil hose within it will be damaged.

According to a further embodiment form of the invention, two gas pressure springs are placed in pairs on opposite sides of each arm, whereby, in advantageous fashion, a bilaterally uniform force application is made by the forces generated by the two gas pressure springs in the particular arm or the second section. By this means, a unilateral torsion loading of the arms, that is caused in the case of only one spring, through the components of the spring force acting in the axial direction of the base body, is compensated for, so that a warping of the arms is effectively prevented, and the wheels always run in the pre-set track.

A further advantage of this embodiment form is that the gas pressure springs can be made with smaller dimensions, and the lateral design space thus made available can be better utilized.

Other features which are considered as characteristic for the invention are set forth in the appended claims.

Although the invention is illustrated and described herein as embodied in radiation source for irradiating the interior walls of elongated cavities, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
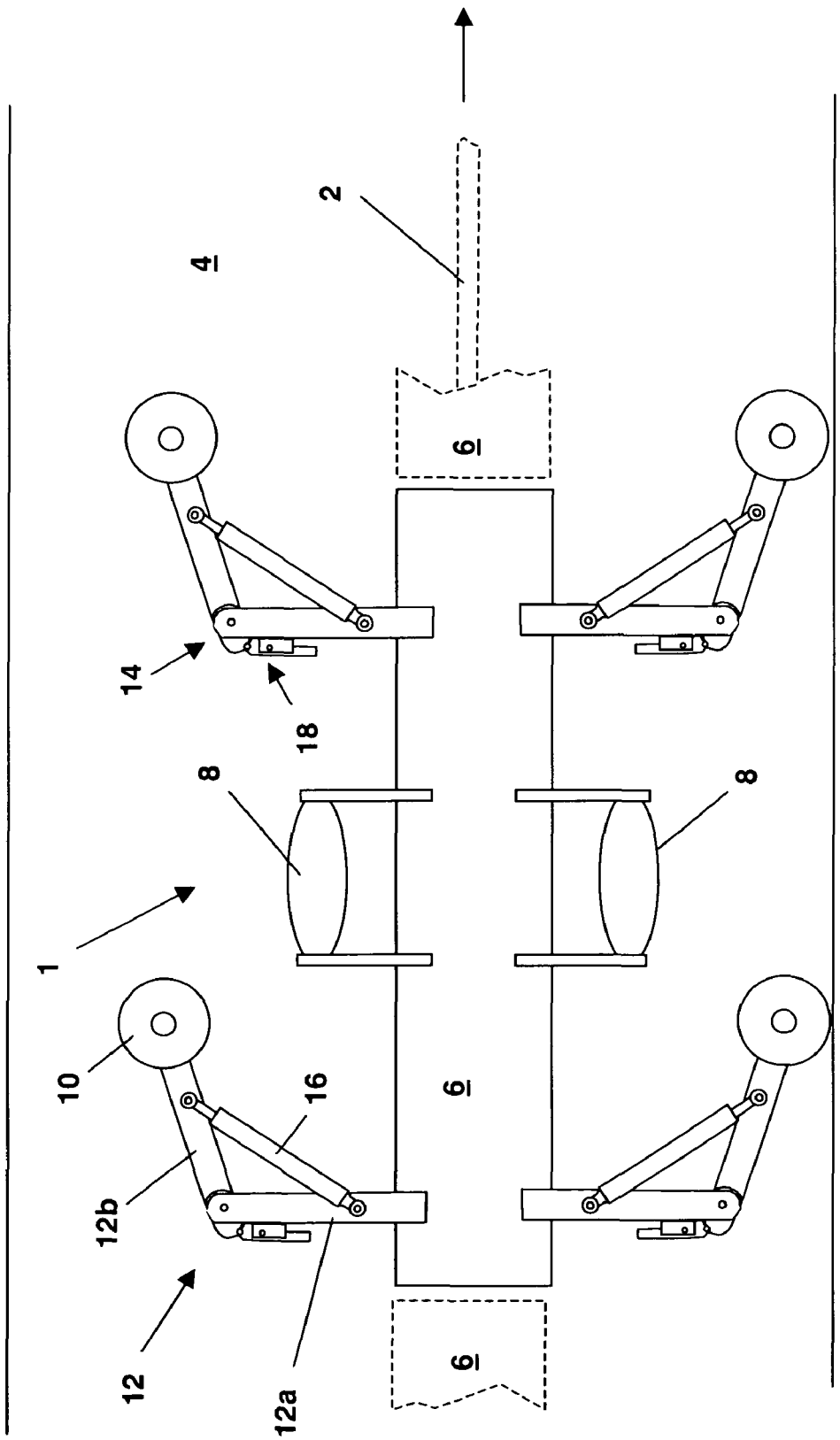
FIG. 1 is a schematic partial view of a radiation source inserted into a cavity in the retracted state prior to deployment.

Referring now to the figures of the drawing in detail and first, particularly, to FIG. 1 thereof, the radiation source apparatus 1 according to the invention is drawn into an elongated cavity 4 via a schematically indicated tension cable 2. The apparatus 1 comprises a base body 6, on which light sources in the form of ultraviolet or infrared lamps 8 are placed, which generate the light for irradiating the inner walls of elongated cavity 4.

As can be gleaned from the depiction of FIG. 1, the base body 6 is preferably designed in modular fashion, which is expressed by the additional modules indicated in dashed lines in FIG. 1.

The base body 6, which may have the form of an elongated tube, carries wheels 10 on associated arms 12. Each arm 12 has a first arm part or section 12a that is securely fastened to the base body 6, as well as a second arm part or second section 12b that is arranged on it via a joint 14 that can be pivoted about a pivoting axis not indicated in greater detail, in a plane.

According to the depiction of FIG. 1, each arm 12 has at least one gas pressure spring 16, which is attached by its first, cylinder-side end so as to turn onto the first section 12a and with its second, piston-side section, onto the second section 12b, preferably close to the wheel 10.

Figure 2:
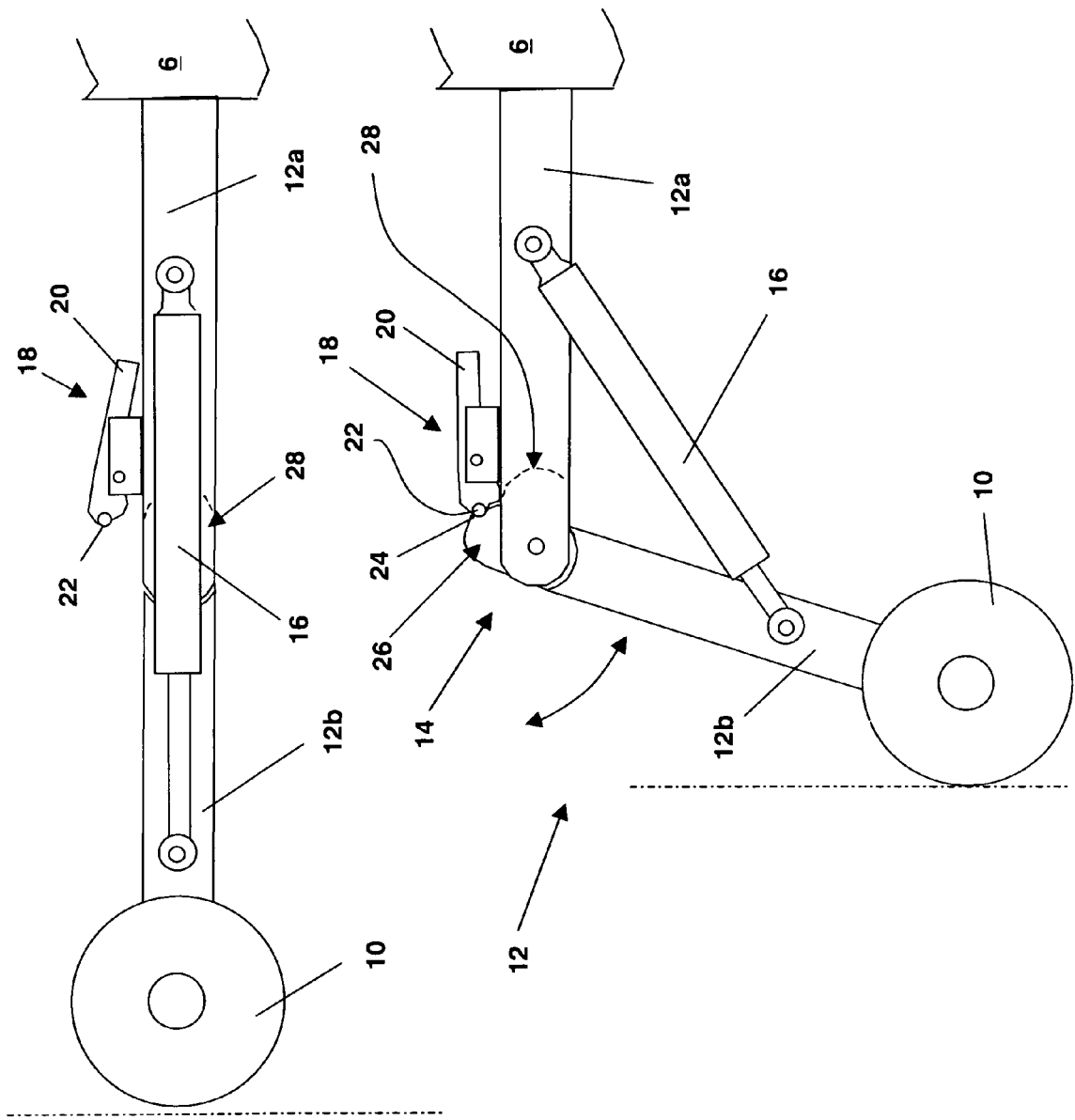
FIG. 2A is a schematic side view of an arm comprising a first and a second section in the fully extended second position.
FIG. 2B is a view of the arm of FIG. 2A in the retracted, radially proximal first position.

The gas pressure spring 16 loads the arm 12 or the second section 12b, with an elastic spring force, which pivots the arm or the second section 12b from a radially proximal first position shown in FIG. 1—which corresponds to the retracted, non-deployed state of radiation source 1, in which preferably it is inserted into cavity 4—into the radially distal position shown in FIG. 2A, in which the wheels 10 of the radiation source touch the inner wall of cavity 4.

As can further be gleaned in detail from the depictions of FIGS. 2A and 2B, an arresting device 18 is preferably assigned to each arm 12. The arresting device 18 comprises a pivoting lever 20 that is placed so as to pivot on the first section 12a about a pivoting axis. A projection or nose 22 is formed on the end of the first section 12a that faces the swiveling joint 14. The nose 22 works together with a second stop 24 provided on the second section 12b.

The stop 24 according to the depiction of FIG. 2B preferably is shaped on a stop section 26 extending from the turning axis of joint 14 outward in the direction of base body 6, and has the form, for example, of a notching with edges running at right angles to each other.

Figure 3:
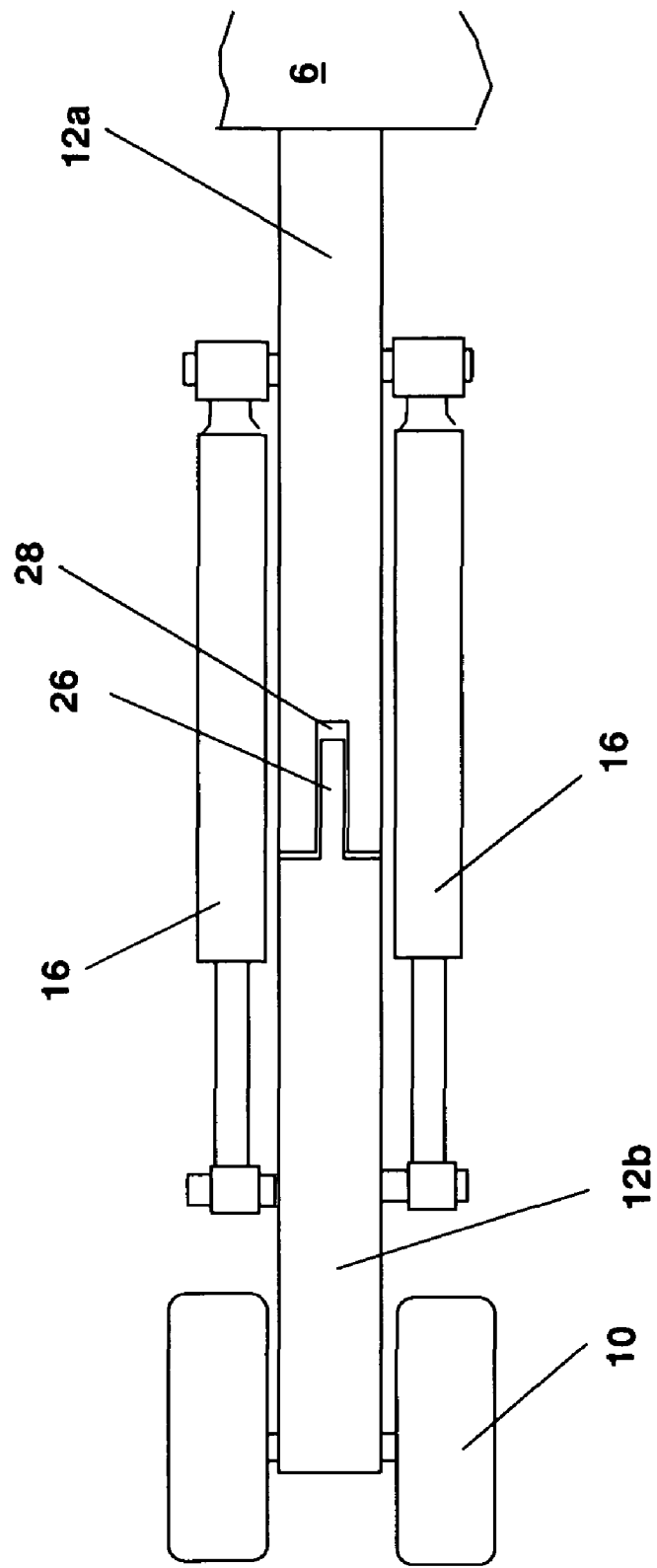
FIG. 3 is a schematic view of the underside of the arm of FIGS. 2A and 2B.

As is further indicated in FIG. 3, the stop section 26 preferably has a width that is reduced relative to the width of the first or section arm part 12a, 12b, and extends into a central recess 28 configured in the first section 12a, which is formed on the joint-side end of the first section 12a.

According to the depiction of FIG. 2B, the stop 24 is pressed by the force exerted by gas pressure spring 16 on second section 12b against the projection or nose 22 of pivoting lever 20, which in turn is braced on the outer side of first section 12b, thereby preventing further motion of stop 24—and thus of the second section 12b—in a self-impeding manner.

To cancel the previously-described arresting of second section 12b in the first retracted radial position of the invention-specific radiation source shown in FIG. 2B, the pivoting lever 20 is swiveled by pressing on the end of the pivoting lever that faces base body 6—as indicated by the arrow in FIG. 2A—into the position shown in FIG. 2A, by which the projection or nose 22, that can also be configured as a pin, is deployed outward from joint 14 beyond the stop section 26, so that the second section 12b is pivoted in damped fashion by the force of gas pressure spring 16 in the same direction as pivoting lever 20—clockwise in FIGS. 2A and 2B—into—the position of FIG. 2A.

As finally is shown in FIG. 3, according to another embodiment form of the invention-specific radiation source, two gas pressure springs 16 can be assigned to each arm 12, which preferably are identically configured, and which—viewed in the axial direction of base body 6—are placed in pairs on opposite sides of each arm.

The invention claimed is:

1. A radiation source apparatus for irradiating an inner wall of an elongated cavity, comprising:
   a base body having at least one light source;
   a plurality of wheels for guiding said base body in the elongated cavity;
   a plurality of arms each carrying a respective one of said wheels for guiding said base body within the cavity movably in a radial direction relative to said base body between a radially proximal first position and radially distal second positions;
   each said arm having a respective first arm section rigidly mounted to said base body and extending outwardly from said base body, and a respective second arm section articulated to said first arm section;
   at least one gas pressure spring assigned to each said arm for pushing the respective said arm from the radially proximal first position to a radially distal second position, said at least one gas pressure spring having a first end connected to said first arm section and a second end connected to said second arm section of the respectively associated said arm.

2. The radiation source apparatus according to claim 1, wherein said light source is a UV or IR radiation source and the apparatus is configured for hardening artificial resin laminates that can be radiation hardened using ultraviolet or infrared radiation.

3. The radiation source apparatus according to claim 1, wherein said gas pressure spring, in a retracted state thereof, is configured to act as a stop preventing further swiveling motion of said arm towards said base body beyond the radially proximal first position.

4. The radiation source apparatus according to claim 1, which comprises an arresting device for each arm, said arresting device locking said arm in the radially proximal first position against pivoting into the radially distal second position.

5. The radiation source apparatus according to claim 4, wherein said arresting device includes a stop formed on said second arm section, and a pivoting lever disposed to pivot on said first arm section and to cooperated with said stop on said second arm section.

6. The radiation source apparatus according to claim 1, wherein said at least one gas pressure spring is one of a pair of gas pressure springs assigned to each said arm.

7. The radiation source apparatus according to claim 6, wherein said gas pressure springs are placed in pairs laterally on opposite sides of each arm.

* * * * *